United States Patent [19]

Osborne

[11] Patent Number: 5,026,422

[45] Date of Patent: Jun. 25, 1991

[54] POWDER COATING COMPOSITIONS

[75] Inventor: Timothy W. Osborne, Brooklyn, Ohio

[73] Assignee: Union Carbide Coatings Service Technology Corporation, Danbury, Conn.

[21] Appl. No.: 431,191

[22] Filed: Nov. 3, 1989

[51] Int. Cl.$^5$ .......... C04B 9/02; C04B 35/56; C04B 35/58; C09K 3/30

[52] U.S. Cl. .............. 106/14.11; 106/14.21; 106/14.25; 252/310; 252/305; 501/88; 501/92; 501/96

[58] Field of Search .............. 501/88, 92, 96; 106/122, 271, 14.11, 14.21, 14.25; 252/305, 310; 222/394; 424/47

[56] References Cited

U.S. PATENT DOCUMENTS

| | | | |
|---|---|---|---|
| 3,088,874 | 5/1963 | Geary et al. | 167/82 |
| 3,773,683 | 12/1973 | Aubert | 252/305 |
| 4,029,000 | 6/1977 | Nakamura et al. | 92/170 |
| 4,056,500 | 11/1977 | Stern | 260/29.6 MN |
| 4,110,427 | 8/1978 | Kalat | 424/46 |
| 4,384,661 | 5/1983 | Page et al. | 222/394 |

OTHER PUBLICATIONS

CERAC, Incorporated, Milwaukee, WI "Material Safety Data Sheet".
Standard Oil Engineered Materials Company, Sanborn, NY, "Material Safety Data Sheet".
Sintec Keramik GmbH, Romantische Strabe 18 D--Buching "Material Safety Data Sheet".

Primary Examiner—William R. Dixon, Jr.
Assistant Examiner—Michael Marcheschi
Attorney, Agent, or Firm—Cornelius F. O'Brien

[57] ABSTRACT

A powder-containing composition, such as a boron nitride-containing composition for use as a film-forming coating on substrates, comprising particulate powders and particulate clay dispersed in water. The composition is also suitable for use in aerosol cans.

11 Claims, No Drawings

POWDER COATING COMPOSITIONS

FIELD OF THE INVENTION

The present invention relates to a powder-containing composition for use as a film-forming coating for various substrates. The composition comprises particulate powders, such as boron nitride powders and clay dispersed in water.

BACKGROUND OF THE INVENTION

Boron nitride has been used extensively for vaporization vessels (also known as vaporization boats) used for metal evaporation. In addition to the use of solid boron nitride articles, such as vaporization vessels, boron nitride powders have found use in many applications such as coatings for high temperature molds to facilitate release of glass, metals, ceramics or the like. Boron nitride coatings can also be used as antisputter coatings for welding applications; anticorrosive coatings for various substrates; and thermally conductive/ electrically insulating coatings for electronic equipment.

In addition to boron nitride powders, many other powders such as borides, carbides and oxides of metals have utilization for various applications when applied to a substrate as a film-forming coating. To be a good film coating that can be sprayed on substrates, the powders have to be dispersed in a liquid vehicle along with a binder type ingredient to insure that the dispersed powder will adhere to the substrate. Many different types of vehicle binder solutions have been used with particulate powders to provide a sprayable composition that can be used in an aerosol can with a conventional propellant gas such as isobutane.

It is an object of the present invention to provide a powder-containing composition, such as a boron nitride-containing composition, that when applied to a surface of a substrate will produce a coating having good adherence to the substrate.

It is another object of the present invention to provide a powder-containing composition consisting essentially of particulate powder and clay dispersed in water.

It is another object of the present invention to provide a powder-containing composition that uses a minor amount of clay as a binder.

It is another object of the present invention to provide a boron nitride-containing composition comprising particulate boron nitride in combination with particulate clay dispersed in water.

It is another object of the present invention to provide a boron nitride-containing composition comprising particulate boron nitride and particulate clay in combination with aluminum nitride, titanium diboride and/or titanium dioxide dispersed in water.

It is another object of the present invention to provide an economical vehicle-binder for particulate powders that can be used to facilitate the depositing of the powders on a substrate as an adhered film or coating.

Additional objects of the invention will become evident from the description that follows.

SUMMARY OF THE INVENTION

The invention relates to a powder-containing composition for use as a film-forming coating on substrates, said composition containing particulate powder and particulate clay dispersed in water.

As used herein the term powders or powder shall mean powders of a single powder component or a mixture of different powders. For example, powders could comprise boron nitride powders, or boron nitride powders mixed with titanium dioxide powders.

It has been discovered that water can be used as the vehicle liquid for a blend of a particulate powders and particulate clay to produce a sprayable or spreadable composition that can be deposited on a substrate to form an adhered coating of the powder on the substrate. The clay acts as the binder for the powders so that once the composition is deposited on the substrate, the water evaporates leaving an adhered coating of the powder clay mixture on the substrate. The benefit of the subject invention is that any particulate powder such as borides, carbides and oxides of metals can be used with the particulate clay along with water to provide an excellent sprayable or spreadable composition. Examples of suitable particulate powders would be boron nitride, titanium diboride, boron carbide, aluminum oxide, magnesium oxide, zirconium oxide, aluminum nitride, silicon nitride, silicon carbide, titanium dioxide, yttrium oxide, graphite, carbon and mixtures thereof. The oxide powders may be used to produce coatings having good high temperature and oxidation resistant characteristics. The graphite or carbon powder may be used to produce coatings which have electrical conductivity and fire retardant characteristics. To change or alter the characteristics of a coating made using a single component powder, one or more other powders could be added to form a mixture which could then be used along with particulate clay in water to form the sprayable or spreadable composition. For example, titanium diboride powders could be added to boron nitride powders to increase the electrical conductivity of the boron nitride deposited coating or aluminum nitride powders could be added to boron nitride powders to increase the thermal conductivity of the boron nitride deposited coating. Also a particulate carbonaceous material could be mixed with any other powder to increase the electrical conductivity of the deposited coating. The preferred particulate powders for use in this invention would be boron nitride, titanium diboride, boron carbide, aluminum nitride, graphite and mixtures thereof.

The particulate powders for use in this invention may be sized for 0.1 micron to 50 microns, preferably from 0.5 micron to 30 microns and most preferably from 5 microns to 15 microns. The powder-containing composition when intended for use in aerosol can applications preferably should have the particulate powders sized from 6 microns to 12 microns. The particulate powders may be present in the composition in an amount from 20 to 99 weight percent, preferably 30 to 96 weight percent, based n the weight of the solid components of the composition. Particulate inert filler materials, h as titanium dioxide, may also be added to the composition, if desired, so that less of an expensive particulate powder could be used. The combination of filler material and particulate powders should be within the weight percentages indicated above. For an aerosol can application, the particulate powder preferably should be from about 1.5 to 6 weight percent and the clay should be from 0.2 to 5.0 weight percent based on the weight of the overall composition in which the overall composition comprises the powder, clay, water and propellant gas.

The clay for use in this invention generally comprises particles of hydrous aluminum silicates and, depending where obtained, other minerals. Like the particulate powders, the particulate clay may be sized from 0.1 micron to 50 microns, preferably from 0.5 micron to 30 microns. When the composition is intended for use in aerosol can applications, the size of the particulate clay should preferably be from 6 microns to 12 microns. The amount of clay to be employed in the composition can vary from 1 to 80 weight percent, preferably 4 to 70 weight percent, based on the weight of the solid components of the composition. A sufficient amount of the clay should be used to enable the particulate powders to adhere to a substrate to form an adhered coating on the substrate. A suitable clay for use in this invention can be obtained commercially from NL Chemicals, Inc. under its trademark Bentone EW which is an organo/clay (tetraalkyl ammonium bentonite).

The water for use in this invention can be regular tap water. However if the coating is intended to be used in a particular application where any impurities could pose a problem, then it would be preferred to use deionized water. Thus the end use application of the coated deposit will dictate the purity of the powders, clay and water to be used. The amount of water in this composition may be from 20 to 80 weight percent based on the weight of the overall composition including the particulate powders and clay. Water in an amount less than 20 weight percent would not provide sufficiently low viscosity to have effective dispersion of the powders and clay. Water in excess of 80 weight percent would provide a diluted composition that would not be effective for most applications.

The powder-containing composition of this invention may be brush painted or sprayed on a substrate or the substrate may be dipped in the composition to produce an adhered powder coating. The powder-containing composition of this invention may also be used in an aerosol can with a conventional propellant gas such as isobutane. In this embodiment, the novel powder-containing composition may be dispersed from the aerosol can directly onto the surface of a substrate to produce an adhered coating of the powder that will remain on the substrate. Any suitable propellant gas used in aerosol cans may be employed with the powder-containing composition of this invention. For example, suitable propellant gases are isobutane, carbon dioxide, propane and mixtures thereof and can be present in an amount of at-least 30, preferably between 30 and 40, weight percent based on the weight of the overall composition.

The powder-containing composition of this invention may be dispersed on any type or shape of substrate where a specific powder coating would be desirous. For example, the powder-containing coat such substrates as graphite, paper, metal,
, ceramics, and the like.

EXAMPLE 1

A powder-containing composition was formulated of the components listed below in Table 1.

TABLE 1

| Component | Weight Percent | Weight |
|---|---|---|
| Deionized Water | 65 | 6.83 lbs. |
| Clay* | 2 | 0.21 lbs. |
| Titanium Dioxide** | 16.5 | 1.73 lbs. |
| Boron Nitride | 16.5 | 1.73 lbs. |

TABLE 1-continued

| Component | Weight Percent | Weight |
|---|---|---|
| Powders** | | |

*Clay was obtained commercially from NL Chemicals, Inc. under its trademark Bentone EW for an organo/clay (tetraalkyl ammonium bentonite) with a typical size of about 1 micron.
**sized 7 to 10 microns.

The deionized water was placed in a vessel and, while being agitated, the clay was fed into the water until a smooth blend was obtained. While still being agitated, the boron nitride and titanium dioxide powders were added until a smooth consistency blend was obtained. The titanium dioxide powder was added as an inert filler so as to reduce the amount of boron nitride in the composition. The boron nitride-containing composition was deposited on a graphite substrate by brush and then the water in the dispersed composition evaporated leaving a coating containing boron nitride, titanium dioxide and clay secured to the substrate. The overall coating had a relatively hard surface and adhered to the graphite substrate.

EXAMPLE 2

A powder-containing composition was formulated of the components listed below in Table 2.

TABLE 2

| Component | Weight Percent | Weight |
|---|---|---|
| Deionized Water | 65 | 6.83 lbs. |
| Clay* | 2 | 0.21 lbs. |
| Titanium Diboride** | 33 | 3.46 lbs. |

*Clay was obtained commercially from NL Chemicals, Inc. under its trademark Bentone EW for an organo/clay (tetraalkyl ammonium bentonite) with a typical size of about 1 micron.
**sized 7 to 10 microns.

The deionized water was placed in a vessel and, while being agitated, the clay was fed into the water until a smooth blend was obtained. While still being agitated, the titanium diboride powder was added until a smooth consistency blend was obtained. The titanium diboride-containing composition was deposited on a graphite substrate by brush and then the water in the dispersed composition evaporated leaving a coating containing titanium diboride and clay secured to the substrate. The overall coating had a relatively hard surface and was well adhered to the substrate.

EXAMPLE 3

A powder-containing composition was formulated of the components listed below in Table 3.

TABLE 3

| Component | Weight Percent | Weight |
|---|---|---|
| Deionized Water | 65 | 6.83 lbs. |
| Clay* | 2 | 0.21 lbs. |
| Boron Carbide** | 33 | 3.46 lbs. |

*Clay was obtained commercially from NL Chemicals, Inc. under its trademark Bentone EW for an organo/clay (tetraalkyl ammonium bentonite) with a typical size of about 1 micron.
**sized 7 to 10 microns.

The deionized water was placed in a vessel and, while being agitated, the clay was fed into the water until a smooth blend was obtained. While still being agitated, the boron carbide powder was added until a smooth consistency blend was obtained. The boron carbide-containing composition was deposited on a graphite substrate by brush and then the water in the dispersed composition evaporated leaving a coating containing boron carbide and clay secured to the substrate. The overall coating had a relatively hard surface and was well adhered to the substrate.

EXAMPLE 4

(Proposed Example)

Using conventional techniques a composition may be formulated of the components listed in Table and then fed into a conventional aerosol can.

TABLE 4

| Deionized Water | 59 weight percent |
| Clay* | 0.2 weight percent |
| Titanium Dioxide** | 2.9 weight percent |
| Boron Nitride** Powder | 2.9 weight percent |
| Propellant Gas Isbutane | 35 weight percent |

*Clay was obtained commercially from NL Chemicals, Inc. under its trademark Bentone EW for an organo/clay (tetraalkyl ammonium bentonite) with a typical size of about 1 micron.
**sized 7 to 10 microns.

The composition may be sprayed from the aerosol can onto any substrate until a desired thickness layer of coating is produced.

While in the foregoing specification a detailed description of specific embodiments of the invention was set forth for the purpose of illustration, it is to be understood that many of the details herein given may be varied considerably by those skilled in the art without departing from the spirit and scope of the invention.

What is claimed:

1. A powder-containing coating composition consisting of particulate powder selected form the group consisting of borides, carbides, oxides of metals, and mixtures thereof, dispersed in water and clay dispersed in water; said particulate powder sized from 0.1 micron to 50 microns and present in the composition in an amount from 20 to 99 weight percent based on the weight of the solid components of the composition; said clay sized from 0.1 micron to 50 microns and present in the composition in an amount from 1 to 80 weight percent based on the weight of the solid components of the composition.

2. The powder-containing composition of claim 1 wherein the particulate powder is selected from the group further consisting of boron nitride, titanium diboride, boron carbide, aluminum oxide, magnesium oxide, zirconium oxide, aluminum nitride, silicon nitride, siliconcarbide, titanium dioxide, yttrium oxide, graphite, carbon and mixtures thereof.

3. The powder-containing composition of claim 1 wherein said water is present in the composition from 20 to 80 weight percent based on the weight of the composition.

4. The powder-containing composition of claim 3 wherein said clay is present in an amount from 4 to 70 weight percent based on the weight of the solid components of the composition and said particulate powder is present in an amount from 30 to 96 weight percent based on the weight of the solid components of the composition.

5. The powder-containing composition of claim 3 wherein said water is deionized.

6. The powder-containing composition of claim 1 employed in an aerosol spray can and further comprising a propellant gas.

7. The powder-containing composition of claim 6 wherein said propellant gas is selected from the group consisting of isobutane, carbon dioxide, propane and mixtures thereof.

8. The powder-containing composition of claim 6 wherein the propellant gas is present in an amount of at least 30 weight percent based on the weight of the composition.

9. The powder-containing composition of claim 6 wherein said particulate powder is selected from the group consisting of boron nitride, titanium diboride, aluminum nitride, titanium dioxide, boron carbide and mixtures thereof.

10. The powder-containing composition of claim 9 wherein the particulate powder is from 1.5 to 6.0 weight percent, the clay is from 0.2 to 5.0 weight percent, the water is from 20 to 80 weight percent and the propellant is from 30 to 40 weight percent based on the weight of the composition.

11. The powder-containing composition of claim 10 wherein the particulate powder is boron nitride and titanium dioxide, and the propellant gas is carbon dioxide.

* * * * *

UNITED STATES PATENT AND TRADEMARK OFFICE
CERTIFICATE OF CORRECTION

PATENT NO.  : 5,026,422
DATED       : June 25, 1991
INVENTOR(S) : Timothy W. Osborne It is certified that error appears in the above-identified patent and that said Letters Patent is hereby corrected as shown below:

Column 1, line 21 "conductive/ electri-" should read ---conductive/electri- ---

Column 2, line 53 "n" should read ---on---

Column 2, line 54 "h" should read ---such---

Column 3, line 50 "at-least" should read ---at least---

Column 3, line 55, after "powder-containing" add ---composition of the invention is ideally suited to---

Column 3, line 56, after "metal," add ---fabrics,---

Column 3, line 57, delete "," first occurrence

Column 5, line 9, after "Table" add ---4---

Column 5, claim 1, line 33 "form" should read ---from---

Column 6, line 4 "concarbide," should read ---con carbide,---

Signed and Sealed this

Twentieth Day of October, 1992

Attest:

DOUGLAS B. COMER

*Attesting Officer*   *Acting Commissioner of Patents and Trademarks*